S. JACKSON.
Running Gear for Carriages.
No. 88,637. Patented April 6, 1869.
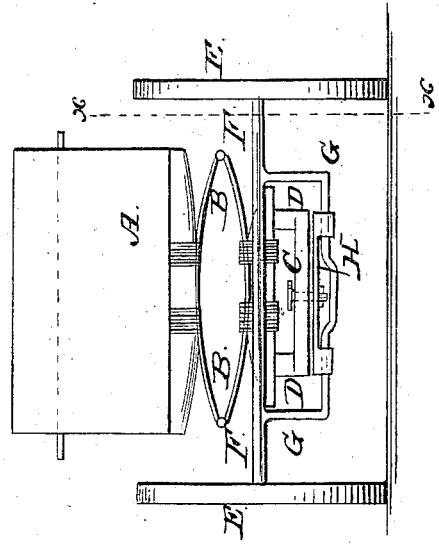
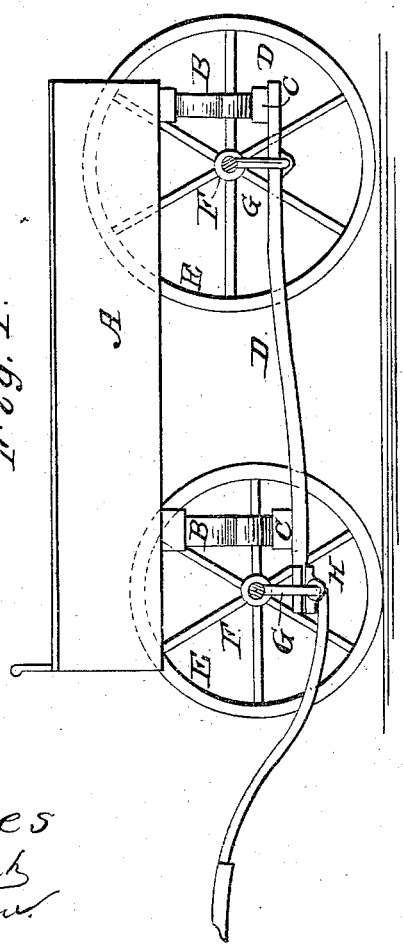
Witnesses
Inventor
S. Jackson

SAMUEL JACKSON, OF NEWARK, NEW JERSEY.

Letters Patent No. 88,637, dated April 6, 1869.

---

IMPROVEMENT IN CARRIAGES.

---

The Schedule referred to in these Letters Patent and making part of the same.

---

*To all whom it may concern:*

Be it known that I, SAMUEL JACKSON, of Newark, Essex county, New Jersey, have invented a new and useful Improvement in Wheeled Vehicles; and I do hereby declare that the following is a full, clear, and exact description thereof, which will enable others skilled in the art to make and use the same, reference being had to the accompanying drawings, forming part of this specification.

Figure 1 is a side view of a wagon, to which my improvement has been attached, partly in section, through the line x x, fig. 2.

Figure 2 is a front view of the same, the tongue, or thills, being removed.

Similar letters of reference indicate corresponding parts.

My invention has for its object to so improve the construction of the running parts of wagons, and other vehicles, that they may be easier for the horses, easier for those riding in them, and easier upon the vehicles themselves, making them less liable to be broken should one or more of the wheels strike an obstruction; and It consists in making the axles movable, and in connecting them with the frame-work of the vehicle in such a way that the weight may be supported below the axes of the wheels, as hereinafter more fully described.

A is the wagon-box.

B are the springs.

C are the cross-bars, upon which the springs B rest. The cross-bars C rest upon the reach-frame D, and are securely attached to said frame D.

E are the wheels, which are secured to and work upon the journals of the axles F in the ordinary manner.

G are crank-arms, or bars, the upper ends of which are securely connected to the axles F, and the lower or horizontal parts of which work in bearings attached to the lower sides of the side bars of the reach-frame D, and to the fifth-wheel H, so that the weight of the load, and of the body of the vehicle, may be supported below the axes of the wheels E, leaving the axles F free to vibrate, move, or swing back and forth.

It should be observed that the arms G may be made in the form of short bars, having eyes in each end, the eye in the upper end receiving the axle, and the eye in the lower end receiving the spindle, or pin, by which the said bar is connected with the reach-frame or fifth-wheel.

By this construction, should one or more of the wheels strike an obstruction, the movement or swing of the axles very greatly diminishes the jar, and also the liability to break the vehicle.

It should be observed that the axles may extend entirely across the vehicle, from wheel to wheel, as shown in fig. 2, or their middle parts may be cut away, or they may be bent, so that the axle F and crank-arms, or bars G, may form one solid piece, as may be desired or convenient, the main point being that the weight may be supported below the axes of the wheels in such a way that the axles may be free to move, vibrate, or swing, so as to give a yielding movement to the body or wheels of the vehicle.

It should be observed that the relative position of the springs and axles is wholly immaterial, and may depend upon the style of the vehicle, or the wish of the manufacturer or owner.

I claim as new, and desire to secure by Letters Patent—

Connecting the movable axles F to the frame-work of the vehicle by means of crank-arms, or bars G, formed solidly upon or rigidly attached to the said axles, substantially as herein shown and described, and for the purpose set forth.

The above specification of my invention signed by me, this 27th day of January, 1869.

SAMUEL JACKSON.

Witnesses:
FRANK BLOCKLEY,
JAMES T. GRAHAM.